United States Patent [19]
Naganawa

[11] Patent Number: 5,969,565
[45] Date of Patent: Oct. 19, 1999

[54] VOLTAGE BOOSTER CIRCUIT

[75] Inventor: Koji Naganawa, Tokyo, Japan

[73] Assignee: NEC Corporation, Tokyo, Japan

[21] Appl. No.: 08/858,467

[22] Filed: May 19, 1997

[30] Foreign Application Priority Data

May 17, 1996 [JP] Japan .................................. 8-148148

[51] Int. Cl.[6] ................................................ G05F 1/10
[52] U.S. Cl. ........................ 327/536; 327/540; 363/60; 365/226
[58] Field of Search ................................ 327/536, 537, 327/538, 540, 543, 545; 365/226; 363/60

[56] References Cited

U.S. PATENT DOCUMENTS

| | | | |
|---|---|---|---|
| 4,962,512 | 10/1990 | Kiuchi | 377/78 |
| 5,036,229 | 7/1991 | Tran | 307/497 |
| 5,072,134 | 12/1991 | Min | 327/536 |
| 5,276,646 | 1/1994 | Kim et al. | 365/189.09 |
| 5,337,284 | 8/1994 | Cordoba et al. | 365/227 |
| 5,446,418 | 8/1995 | Hara et al. | 331/57 |
| 5,740,113 | 4/1998 | Kaneko | 365/189.11 |
| 5,796,293 | 8/1998 | Yoon et al. | 327/536 |
| 5,812,017 | 9/1998 | Golla et al. | 327/536 |

FOREIGN PATENT DOCUMENTS

| | | |
|---|---|---|
| 0 466 532 A1 | 1/1992 | France . |
| 4-132088 | 5/1992 | Japan . |
| 8-237938 | 9/1996 | Japan . |

*Primary Examiner*—Jung Ho Kim
*Attorney, Agent, or Firm*—Foley & Lardner

[57] ABSTRACT

For providing a voltage booster circuit wherein the output voltage is boosted up with a sufficient ability, and smoothly and easily controlled as well to maintain a desired voltage level with little fluctuation, the voltage booster circuit of the invention comprises a plurarity of pumping circuits (1—1 to 1-n), each thereof connected in parallel between a power supply (Vcc) and an output terminal (VPUMP) for supplying a higher voltage than the power supply, driven by a pair of complementary pumping clocks; means for generating pump activating signals determining a number to be activated of said plurality of pumping circuits according to potential of the output terminal; and switching means (6-1 to 6-n) for supplying the pair of complementary pumping clocks to each of the number to be activated of the plurality of pumping circuits controlled with said pump activating signals.

7 Claims, 7 Drawing Sheets

VOLTAGE BOOSTER CIRCUIT

BACKGROUND OF THE INVENTION

The present invention relates to a voltage booster circuit, and more particularly to a voltage booster circuit whereof output voltage is able to be controlled stably.

In known voltage booster circuits, there is a type wherein output voltage is controlled not to exceed a maximum value referring to a reference voltage. As an example of this type of voltage booster circuit, there is a prior art disclosed in a Japanese patent application laid open as a Provisional Publication No. 132088/'92, which is embodied for eliminating break of a clamping transistor provided for limiting maximum voltage of its output used for erasing or writing a non-volatile semiconductor memory.

FIG. 8 is a block diagram illustrating circuit configuration of the prior art having a plurality of pumping units 11-1 to 11-n. Each of them, a pumping unit 11-1 for example, comprises a serial connection of a first and a second nMOS transistors MN1 and MN2 each diode-connected, and a first and a second pumping capacitors C1 and C2.

A pumping clock generator 360 generates a pair of complementary pumping clocks Tc and Bc, one of which, the pumping clock Tc for instance, is supplied to gate/drain connection of the first nMOS transistor MN1 through the first pumping capacitor C1, while the other, the pumping clock Bc, is supplied to gate/drain connection of the second nMOS transistor MN2 through the second pumping capacitor C2, of each of the plurality of pumping units 11-1 to 11-n.

Drain of the first nMOS transistor MN1 is supplied with a positive supply Vcc through a diode connection of an input nMOS transistor NTr11. Drains of the first nMOS transistor of each of the following pumping units 11-2 to 11-n is supplied from source of the second nMOS transistor MN2 of each of their preceding pumping units 11-1 to 11-(n-1) and source of the last pumping unit 11-n connected to an output terminal VPUMP.

The output terminal VPUMP, which is connected to source of a pull-up nMOS transistor NTr12 diode connected with its gate and drain supplied from the positive supply Vcc, is also connected to an input of a voltage divider 320. Output level signal VPUMPC output from the voltage divider 320 is compared with a reference voltage VREF supplied from a reference voltage generator 340 by a differential amplifier 330 for obtaining a control signal, with which the pumping clock generator 360 is ON/OFF controlled.

When the output level signal VPUMPC, proportional to potential of the output terminal VPUMP, is lower than the reference voltage VREF, the differential amplifier 330 activates the pumping clock generator 360 with the control signal for generating the pair of complementary pumping clocks Tc and Bc, which drive the pumping capacitor C1 and C2 of every of the plurality of the pumping units 11-1 to 11-n to a HIGH and a LOW level, alternately and complementarily.

When the first pumping capacitor C1 of the first pumping unit 11-1 is pulled down by LOW level of the complementary pumping clock Tc, it is charged with the positive supply Vcc toward a voltage level (Vcc−Vth) through the input nMOS transistor NTr11, Vth being threshold voltage of the nMOS transistors, since the first nMOS transistor MN1 is made OFF with its source pushed up by the HIGH level of the other complementary pumping clock Bc. When the complementary pumping clock Tc is turned to HIGH level, the first pumping capacitor C1 is pushed up and its electric charge flows to the second pumping capacitor C2 through the second nMOS transistor MN2 becoming ON, the input nMOS transistor NTr11 becoming OFF in turn.

In the same way, electric charge is pumped up from drain of the first nMOS transistor MN1 to source of the second l nMOS transistor MN2 in each of the plurality of pumping units 11-1 to 11-n. Therefore, by repeating these pumping cycles, potential of the output terminal VPUMP is boosted up toward a potential (Vcc−Vth+$\Delta$V), $\Delta$V being a potential proportional to the number n of the pumping units 11-1 to 11-n and to peak-to-peak voltage of the complementary pumping clocks Tc and Bc and depending also on pulse widths of the pair of complementary pumping clocks Tc and Bc, for a certain range of output load of the voltage booster circuit.

The potential of the output terminal VPUMP is divided into the output level signal VPUMPC by the voltage divider 320, which is compared by the differential amplifier 330 with the reference voltage VREF generated from the reference voltage generator 340. So, the potential of the output terminal VPUMP is boosted up during VREF$\geq$VPUMPC until the pumping clock generator 360 is disabled when the output level signal VPUMPC becomes higher than the reference voltage VREF. Thus, an output voltage proportional to the reference voltage VREF is obtained from the output terminal VPUMP, in the prior art of FIG. 8.

There is also proposed another type of voltage booster circuits, wherein output potential is controlled by varying pulse widths of the complementary pumping clocks.

However, in the prior art of FIG. 8, there is a problem that it is difficult to maintain potential of the output terminal VPUMP accurately at a desired voltage proportional to the reference voltage VREF without somewhat overshooting or undershooting, because the voltage booster circuit, which should have a sufficient boosting ability compared to its generally varying load, can not be but ON/OFF controlled in the prior art.

On the other hand, in the another type of voltage booster circuits, there is another problem that a certainly complicated circuit configuration is needed for feedback-controlling pulse widths continuously according to output level of the voltage booster circuit, resulting in an increased power consumption.

SUMMARY OF THE INVENTION

Therefore, a primary object of the invention is to provide a voltage booster circuit wherein the output voltage is boosted up with a sufficient ability, and smoothly and easily controlled as well to maintain a desired voltage level with little fluctuation, with a simple circuit configuration.

In order to achieve the object, a voltage booster circuit of the invention comprises:

a plurality of pumping circuits, each thereof connected in parallel between a power supply and an output terminal for supplying a higher voltage than the power supply, driven by a pair of complementary pumping clocks;

a reference voltage generator for generating reference voltages, each of the reference voltages corresponding to each of the plurality of pumping circuits;

a voltage divider for generating an output level signal proportional to potential of the output terminal; and differential amplifiers, each thereof corresponding to each of the reference voltages and generating each of pump activating signals each having logic according to potential difference between the output level signal and corresponding each of the reference voltages;

switching circuits, each thereof corresponding to and supplying the pair of complementary pumping clocks to each of the plurality of pumping circuits according to logic of corresponding each of the pump activating signals.

Therefore, by preparing each value of the reference voltages appropriately, the output terminal can be boosted up with a sufficient ability and controlled to maintain a desired potential with little overshooting or undershooting, in the voltage booster circuit according to the invention.

DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
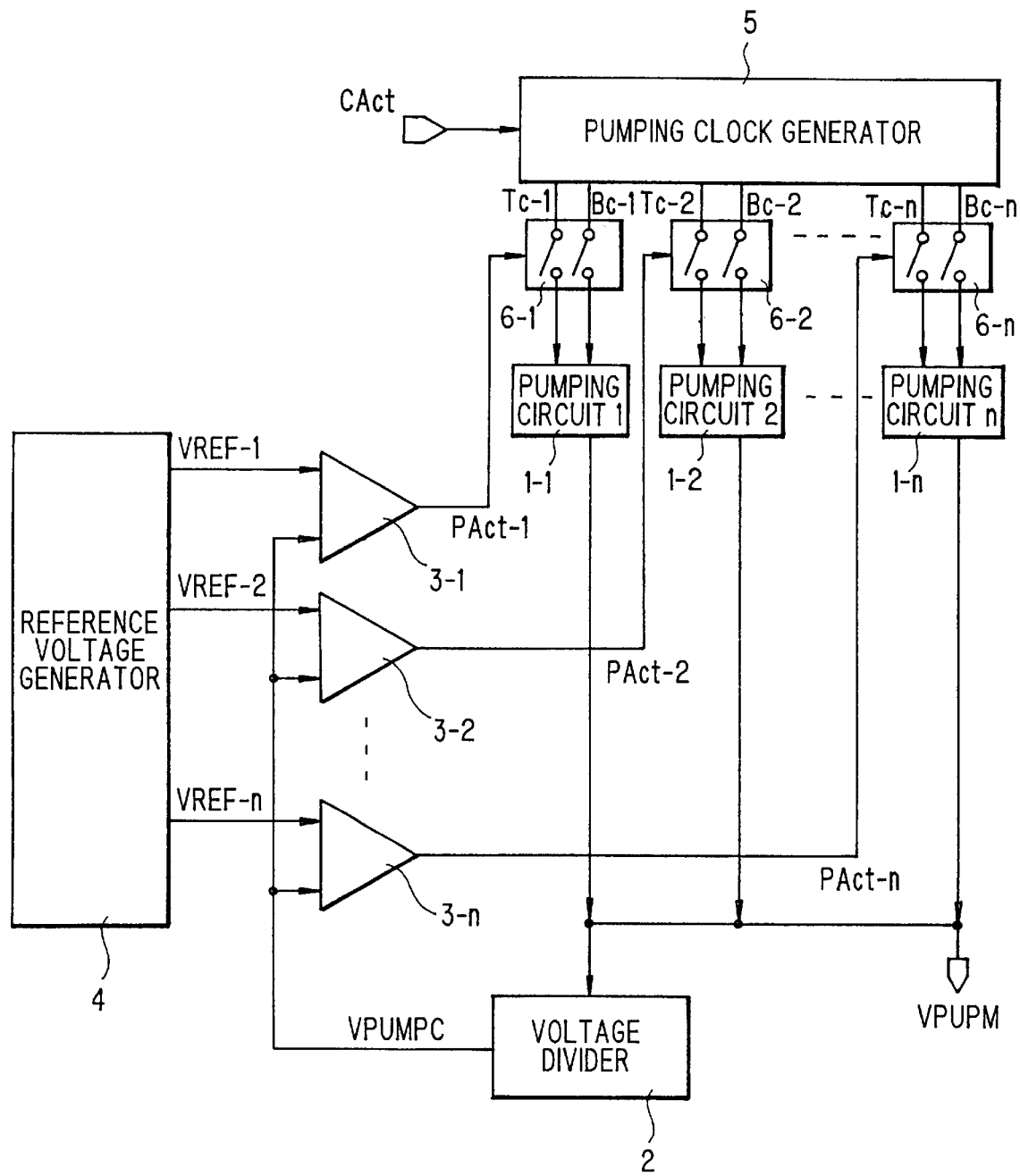
FIG. 1 is a block diagram illustrating a voltage booster circuit according to an embodiment of the invention.

FIG. 1 is a block diagram illustrating- a voltage booster circuit according to an embodiment of the invention, comprising;

a plurality of pumping circuits 1-1 to 1-n, each output of the plurality of pumping circuits 1-1 to 1-n connected in parallel to an output terminal VPUMP, switching circuits 6-1 to 6-n each corresponding to each of the plurality of the pumping circuits 1-1 to 1-n, a pumping clock generator 5 for generating pairs of complementary pumping clocks Tc-1 and Bc-1 to Tc-n and Bc-n when activated with a clock activating signal CAct, each of the pairs of complementary pumping clocks Tc-1 and Bc-1 to Tc-n and Bc-n corresponding to and being supplied to each of the plurality of pumping circuits 1-1 to 1-n through corresponding each of the switching circuits 6-1 to 6-n, a voltage divider 2 for generating output level signal VPUMPC proportional to potential of the output terminal VPUMP, a reference voltage generator 4 for generating reference voltages VREF-1 to VREF-n, each of the reference voltages VREF-1 to VREF-n corresponding to each of the plurality of the pumping circuit 1-1 to 1-n and having different potential with each other, and differential amplifiers 3-1 to 3-n, each of the differential amplifiers 3-1 to 3-n corresponding to each of the plurality of the pumping circuit 1-1 to 1-n and outputting each of pump activating signals PAct-1 to PAct-n for controlling corresponding each of the switching circuits 6-1 to 6-n according to potential difference between the output level signal VPUMPC and corresponding each of the reference voltages VREF-1 to VREF-n.

As for each of the plurality of the pumping circuits 1-1 to 1-n, the voltage divider 2, the differential amplifiers 3-1 to 3-n and the pumping clock generator 5, any appropriate respective circuit may be applied, as well as for the reference voltage generator 4 or the switching circuits 6-1 to 6-n.

Figure 2:
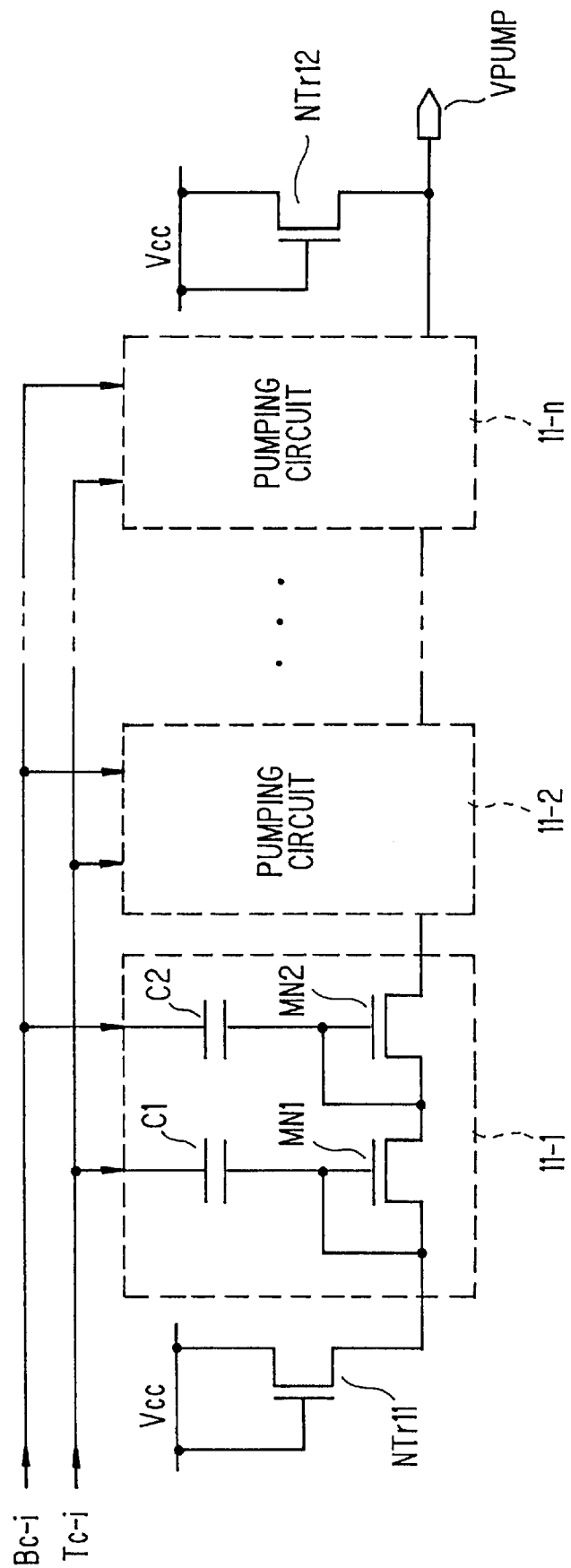
FIG. 2 is a circuit diagram illustrating an example of pumping circuit to be applied for the plurality of pumping circuits 1-1 to 1-n of FIG. 1.
Figure 8:
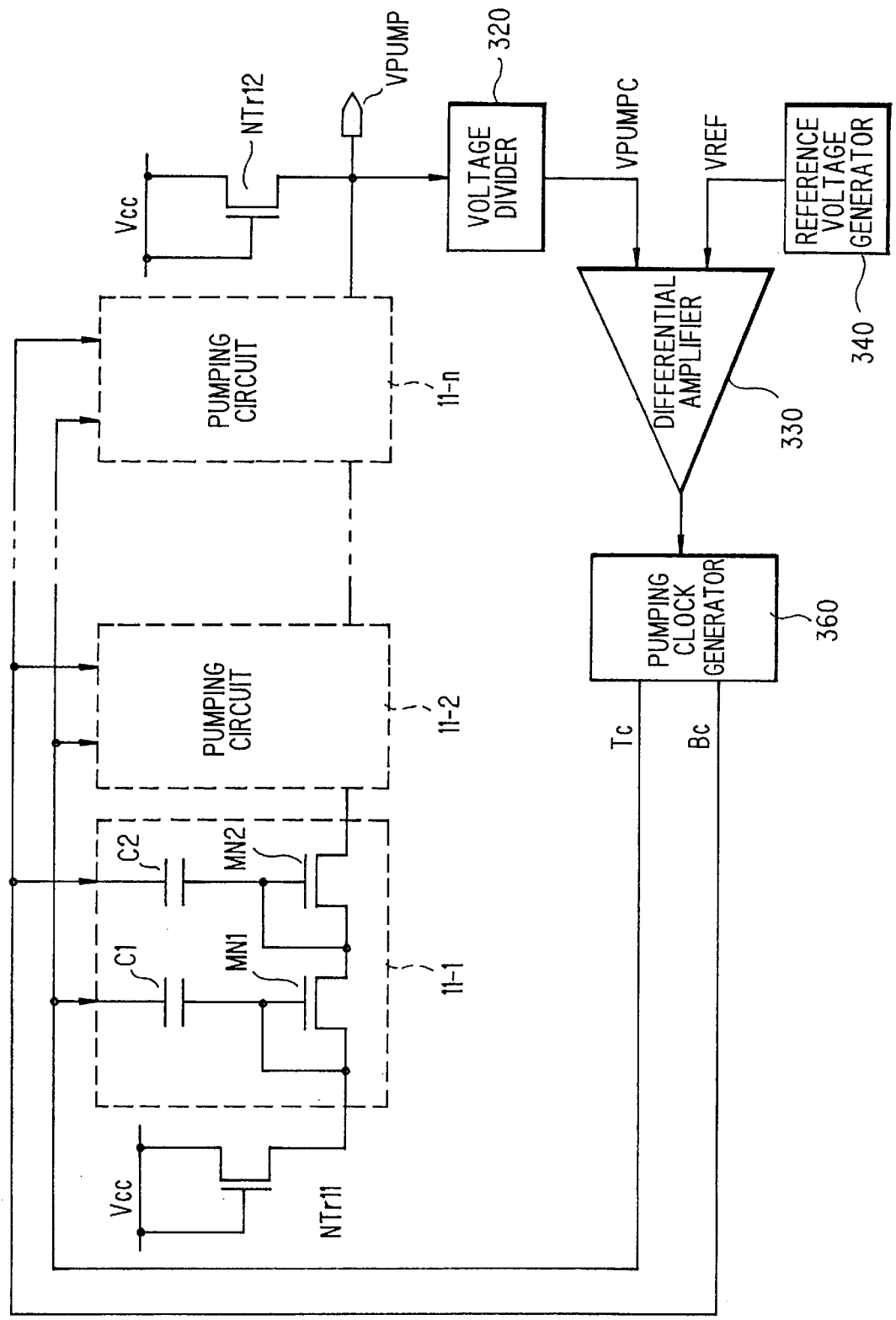
FIG. 8 is a block diagram illustrating a voltage booster circuit of a prior art.

In the embodiment, a pumping circuit having a configuration as shown in FIG. 2, similar to that applied for the prior art of FIG. 8, is applied, for each of the plurality of the pumping circuits 1-1 to 1-n.

Referring to FIG. 2, the pumping circuit comprises;

a cascade connection of a plurality of pumping units 11-1 to 11-m driven with one (Tc-i and Bc-i) of the pairs of the complementary pumping clocks Tc-1 and Bc-1 to Tc-n and Bc-n supplied through corresponding one (6-i) of the switching circuits 6-1 to 6-n, the output of the last pumping unit 11-n of the cascade connection connected to the output terminal VPUMP, a diode connection of an input nMOS transistor NTr11 for supplying a positive supply Vcc to the first pumping unit 3-1 of the cascade connection, and a diode connection of a pull-up nMOS transistor NTr12 for maintaining potential of the output terminal VPUMP more than the positive supply Vcc minus the threshold voltage Vth.

Each of the plurality of the pumping units 11-1 to 11-m has the same circuit configuration with the pumping unit 11-1 of FIG. 8 and the duplicated description is omitted.

Figure 3:
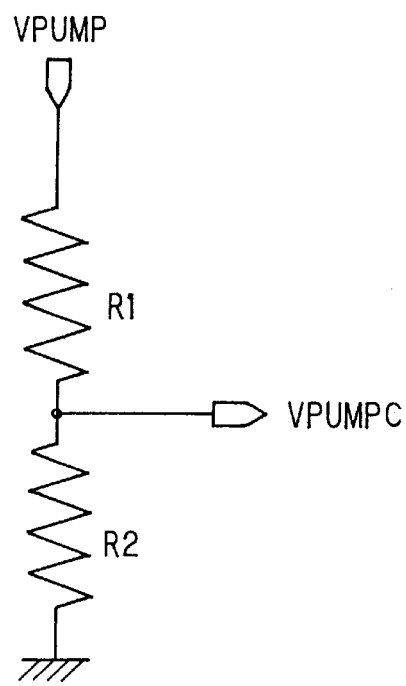
FIG. 3 is a circuit diagram illustrating an example of the voltage divider 2 of FIG. 1.

FIG. 3 is a circuit diagram illustrating an example of the voltage divider 2 having a serial connection of resistors R1 and R2 connected between the output terminal VPUMP and a ground, the output level signal VPUMPC having a potential VPUMPC=VPUMP·R2/(R1+R2) being obtained from connection point of the resistors R1 and R2.

Figure 4:
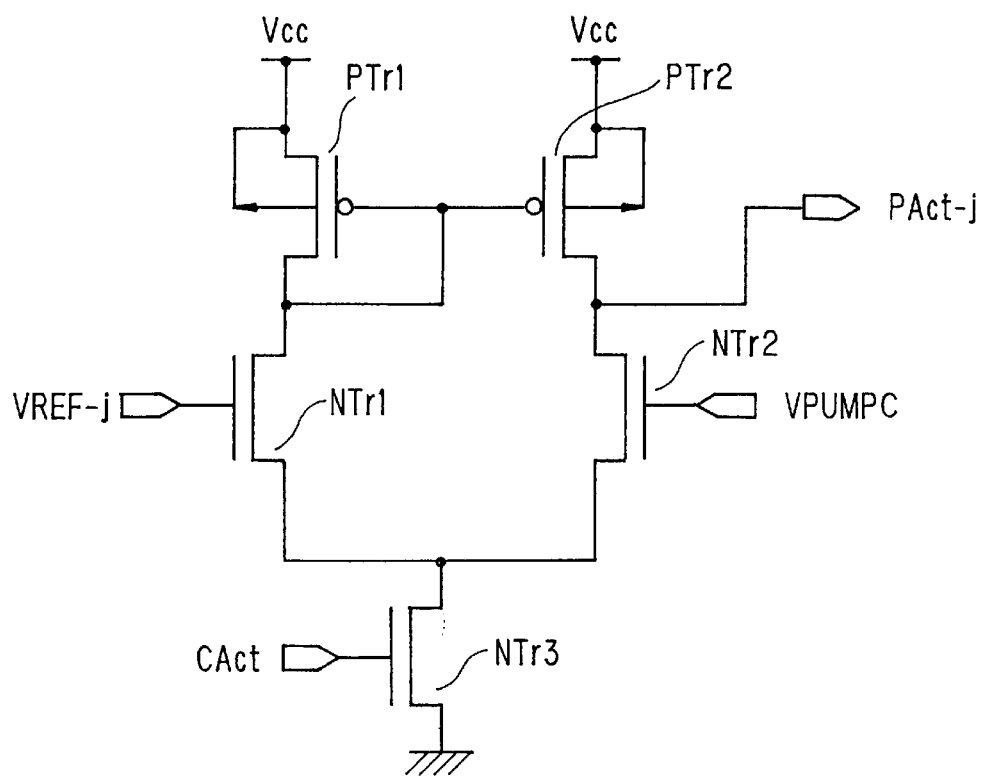
FIG. 4 is a circuit diagram illustrating an example of the differential amplifier to be applied for the differential amplifiers 3-1 to 3-n of FIG. 1.

FIG. 4 is a circuit diagram illustrating an example of the differential amplifier applied for the differential amplifiers 3-1 to 3-n, comprising;

a switching nMOS transistor NTr3 with its source grounded and its gate controlled by the clock activating signal CAct, for disabling the differential circuit when unnecessary, a differential pair of nMOS transistors NTr1 and NTr2, their sources connected to drain of the switching NMOS transistor NTr3, gate of the nMOS transistor NTr2 supplied with the output level signal VPUMPC and gate of the nMOS transistor NTr1 supplied one (VREF-j) of the reference voltages VREF-1 to VREF-n, and a current mirror having an input pMOS transistor PTr1 and an output pMOS transistor PTr2, their sources connected to the positive supply Vcc, their gates connected with each other and connected to drain of the nMOS transistor NTr1 together with drain of the input pMOS transistor PTr1, and drain of the output PMOS transistor PTr2 connected to drain of the nMOS transistor NTr2.

A pump activating signal (PAct-j) for controlling one (6-j) of the switching circuits 6-1 to 6-n is obtained from drain of the nMOS transistor NTr2, which becomes HIGH when VPUMPC≦VREF-i and otherwise LOW.

Figure 5:
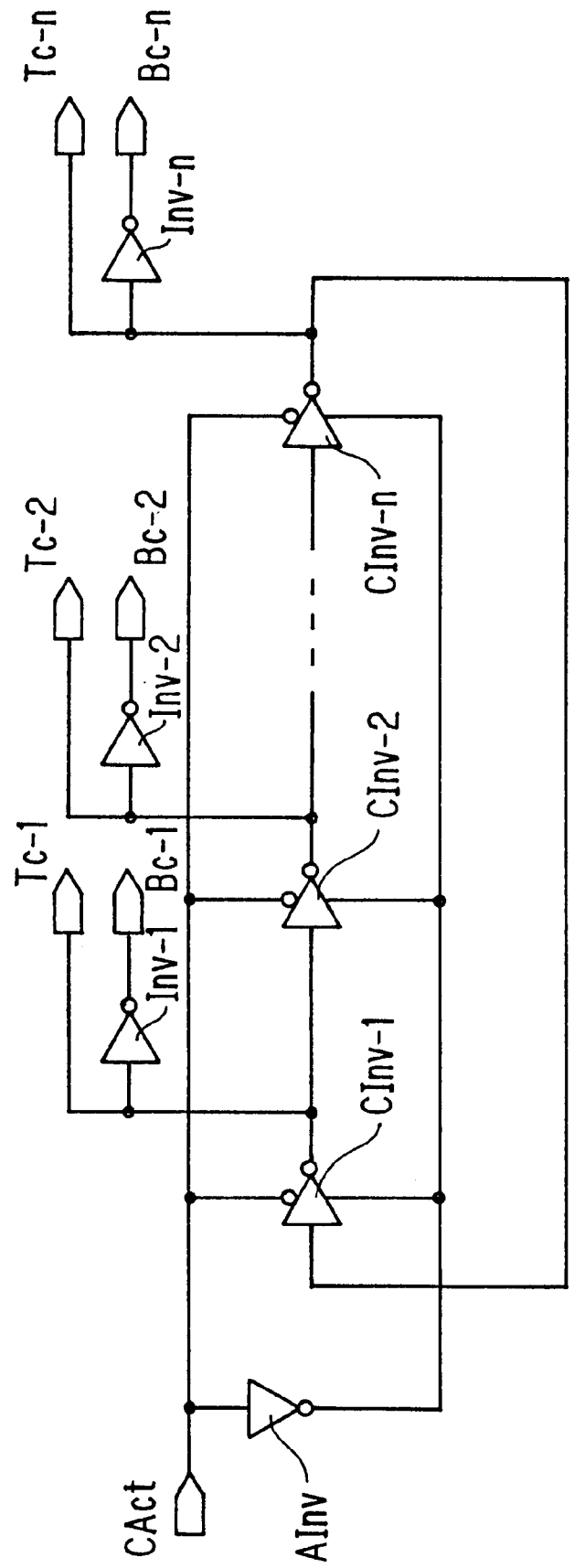
FIG. 5 is a circuit diagram illustrating an example of the pumping clock generator 5 of FIG. 1.

FIG. 5 is a circuit diagram illustrating an example of the pumping clock generator 5, comprising;

a ring oscillator having a ring connection of clock inverters CInv-1 to CInv-n driven by the clock activating signal CAct and its inverted signal, an activating signal inverter AInv for obtaining the inverted signal of the clock activating signal CAct, and clock inverters Inv-1 to Inv-n, each thereof generating each of the complementary pumping clocks Bc-1 to Bc-n by inverting corresponding each of the complimentary pumping clocks Tc-1 to Tc-n obtained from output of corresponding each of the clock inverters CInv-1 to CInv-n.

Figure 6:
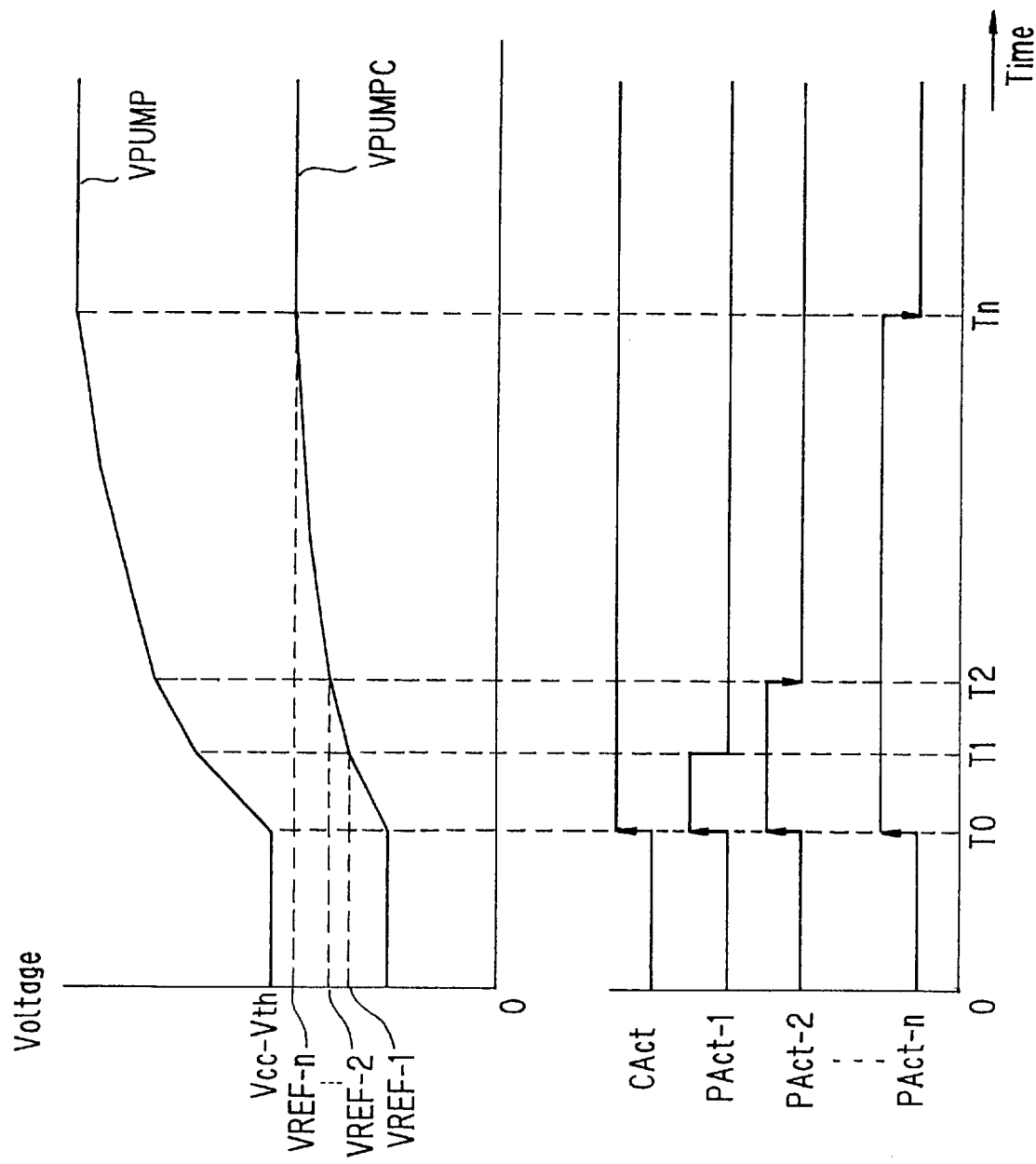
FIG. 6 is a time chart illustrating an example of waveforms in the embodiment of FIG. 1.

Now, operation of the embodiment of FIG. 1 is described referring to a time chart of FIG. 6 illustrating an example of waveforms in the embodiment.

When the clock activating signal CAct is disabled at LOW level until a timing T0, potential of the output terminal VPUMP remains at Vcc−Vth pulled up by the pull-up nMOS transistor NTr12 of each of the plurality of pumping circuits 1-1 to 1-n.

When the clock activating signal CAct becomes HIGH at the timing T0, the pumping clock generator 5 begins to oscillate and generates the pairs of complementary pumping clocks Tc-1 and Bc-1 to Tc-n and Bc-n.

In the beginning, that is an interval from the timing T0 to a timing T1 when the output level signal VPUMPC is lower than any of the reference voltages VREF-1 to VREF-n, the output terminal VPUMP is boosted up by all of the plurality of pumping circuits 1-1 to 1-n in the same way as previously described in connection with FIG. 8, since all of the switching circuit 6-1 to 6-n are controlled to be ON by the pump activating signals PAct-1 to PAct-n output from the differential amplifiers 3-1 to 3-n.

When the output level signal VPUMPC, proportional to the potential of the output terminal VPUMP boosted up with a whole ability of the plurality of the pumping circuits 1-1 to 1-n, becomes higher than a lowest reference voltage, VREF-1 for example, at the timing T1, the corresponding differential amplifier 3-1 is turned and the pump activating signal PAct-1 becomes LOW, which turns the switching circuit 6-1 to OFF, thereby disabling the pumping circuit 1-1 by ceasing to supply the pair of complementary pumping clocks Tc-1 and Bc-1.

The potential of the output terminal VPUMP is continues to be boosted up with the pumping circuits left activated, gradually decreasing in a similar way until the output level signal VPUMPC attains the same potential to the highest reference voltage, VREF-n, for example, at a timing Tn.

When the output level signal VPUMPC becomes lower than the highest reference voltage VREF-n according to discharge of the output terminal VPUMP, the corresponding pumping circuit 1-n begins to boost up again the output terminal VPUMP for maintaining output level thereof.

Thus, by preparing each value of the reference voltages VREF-1 to VREF-n appropriately, the output terminal VPUMP can be boosted up with a sufficient ability and controlled to maintain a desired potential with little overshooting or undershooting.

Figure 7:
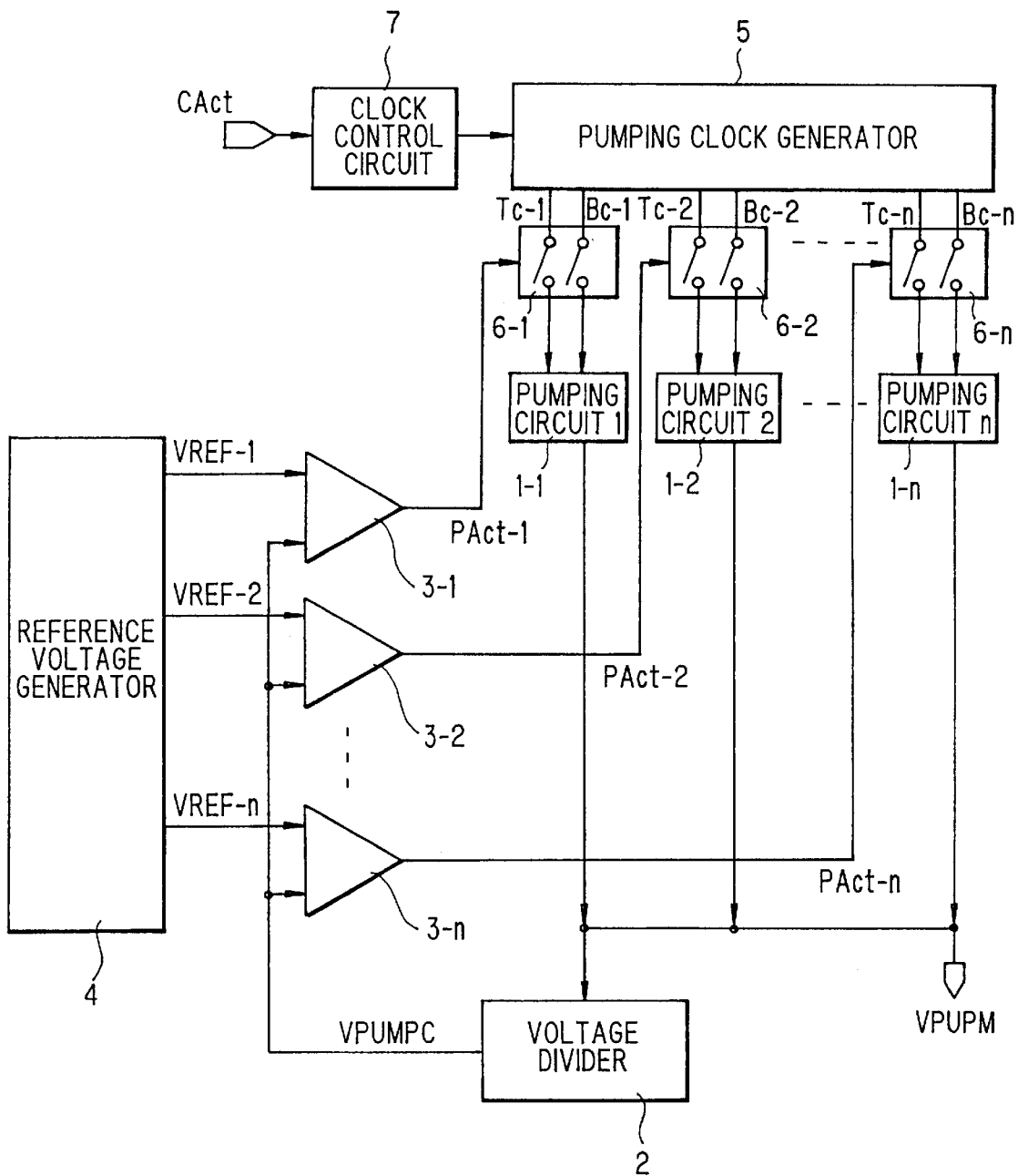
FIG. 7 is a block diagram illustrating another embodiment of the invention.

FIG. 7 is a block diagram illustrating another embodiment of the invention, which has the same configuration of the embodiment of FIG. 1 except for a clock control circuit 7, and so duplicated description is omitted.

The clock control circuit 7 controls the clock activating signal CAct to be supplied to the pumping clock generator 5 according to logic of a pump activating signal (PAct-n) corresponding to the highest reference voltage, VREF-n for example.

When the pump activating signal PAct-n is at logic LOW, that is, when the output terminal VPUMP is sufficiently boosted up and all of the pumping circuits 1-1 to 1-n are disabled, the clock control circuit 7 cease to supply the clock activating signal CAct to the pumping clock generator 5.

Thus, unnecessary current consumption in the pumping clock generator 5 is suppressed in the embodiment of FIG. 7.

As heretofore described, in a voltage booster circuit of the present invention, the output potential is boosted up with a sufficient ability by a plurality of pumping circuits, and smoothly and easily controlled as well to maintain a desired voltage level with little fluctuation, by controlling number of the pumping circuits activated, with a simple and economical circuit configuration.

What is claimed is:

1. A voltage booster circuit comprising:

a plurality of pumping circuits, an output of each of said plurality of pumping circuits connected to an output terminal;

means for increasing or decreasing a number of active pumping circuits of said plurality of pumping circuits according to a comparison of a potential of said output terminal with at least two distinct reference voltages, wherein said means for increasing or decreasing a number of active pumping circuits includes a pair of complementary pumping clocks provided to each of said active pumping circuits.

2. A voltage booster circuit comprising:

a plurality of pumping circuits, each of said plurality of pumping circuits connected in parallel between a power supply and an output terminal for supplying a higher voltage than said power supply, and driven by a pair of complementary pumping clocks;

means for generating pump activating signals determining a number of activated pumping circuits of said plurality of pumping circuits according to a comparison of a potential of said output terminal with at least two distinct reference voltages; and switching means for supplying said pair of complementary pumping clocks to each of said number of activated pumping circuits controlled with said pump activating signals.

3. A voltage booster circuit comprising:

a plurality of pumping circuits, each of said plurality of pumping circuits connected in parallel between a power supply and an output terminal for supplying a higher voltage than said power supply, and driven by a pair of complementary pumping clocks;

means for generating pump activating signals determining a number of activated pumping circuits of said plurality of pumping circuits according to a potential of said output terminal; and switching means for supplying said pair of complementary pumping clocks to each of said number of activated pumping circuits controlled with said pump activating signals, wherein said means for generating pump activating signals includes a reference voltage generator for generating reference voltages, each of said reference voltages corresponding to a respective one of said plurality of pumping circuits, a voltage divider for generating an output level signal proportional to the potential of said output terminal, and differential amplifiers, each of said differential amplifiers corresponding to a respective one of said reference voltages and generating a respective one of said pump activating signals, each differential amplifier having a logic level according to a potential difference between said output level signal and a corresponding one of said reference voltages.

4. A voltage booster circuit comprising:

plurality of pumping circuits, each of said plurality of pumping circuits connected in parallel between a power supply and an output terminal for supplying a higher voltage than said power supply, and driven by a pair of complementary pumping clocks;

means for generating pump activating signals determining a number of activated pumping circuits of said plurality of pumping circuits according to a potential of said output terminal; and switching means for supplying said pair of complementary pumping clocks to each of said number of activated pumping circuits controlled with said pump activating signals, wherein said switching means includes switching circuits, each of said switching circuits corresponding to and supplying said pair of complementary pumping clocks to a respective one of said plurality of pumping circuits according to a logic level of a corresponding one of said pump activating signals.

5. A voltage booster circuit recited in claim 2, further comprising means for disabling a pumping clock generator generating each of said pair of complementary pumping clocks when said switching means are controlled to supply said pair of complementary pumping clocks to none of said plurality of pumping circuits.

6. A voltage booster circuit comprising:

a plurality of pumping circuits, each of said plurality of pumping circuits connected in parallel between a power supply and an output terminal for supplying a higher voltage than said power supply, and driven by a pair of complementary pumping clocks;

a reference voltage generator for generating reference voltages, each of said reference voltages corresponding to a respective one of said plurality of pumping circuits;

a voltage divider for generating an output level signal proportional to a potential of said output terminal;

a plurality of differential amplifiers, each of said plurality of differential amplifiers corresponding to a respective one of said reference voltages and generating a respective one of a plurality of pump activating signals that determines a number of activated pumping circuits of said plurality of pumping circuits, wherein each differential amplifier has logic according to a potential difference between said output level signal and a corresponding one of said reference voltages; and a plurality of switching circuits, each of said plurality of switching circuits corresponding to and supplying said pair of complementary pumping clocks to a respective one of said plurality of pumping circuits according to the logic of a respective one of said pump activating signals.

7. The voltage booster circuit according to claim 6, further comprising a clock control circuit for disabling a pumping clock generator generating each of said pair of complementary pumping clocks when said plurality of switching circuits are controlled to supply said pair of complementary pumping clocks to none of said plurality of pumping circuits.

* * * * *